Jan. 29, 1957  W. FREY  2,779,662
PROCESS AND APPARATUS FOR OBTAINING TITANIUM
DIOXIDE WITH A HIGH RUTILE CONTENT
Filed Oct. 2, 1950  2 Sheets-Sheet 1
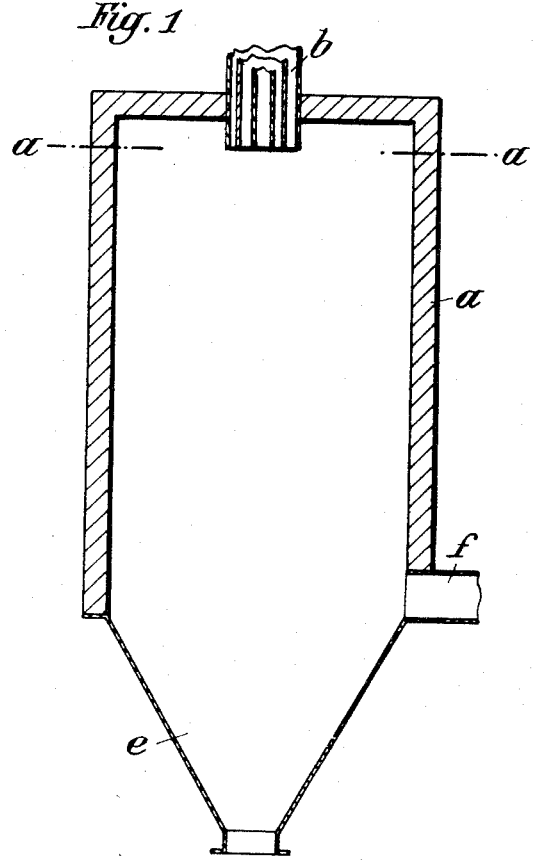
Inventor:
WALTER FREY,
by Wenderoth, Lind & Ponack
Attorneys Jan. 29, 1957 W. FREY 2,779,662
PROCESS AND APPARATUS FOR OBTAINING TITANIUM
DIOXIDE WITH A HIGH RUTILE CONTENT
Filed Oct. 2, 1950 2 Sheets-Sheet 2
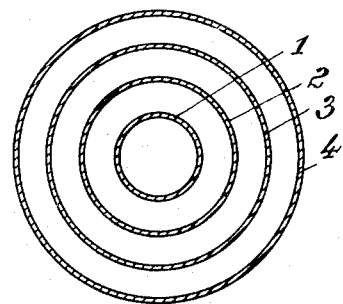
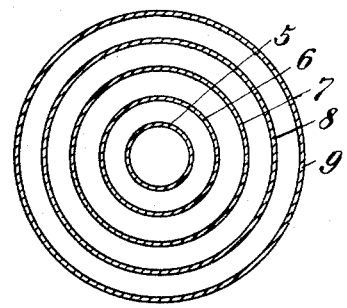
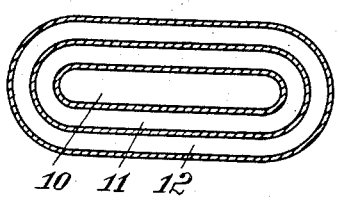
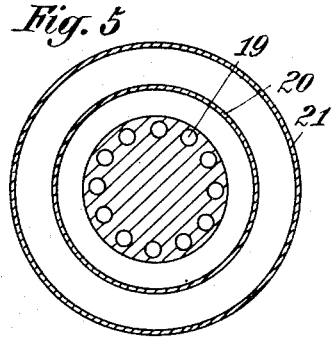
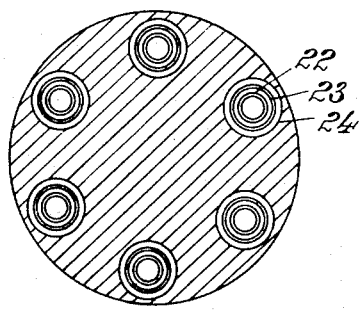
Inventor:
WALTER FREY,
by Wenderoth, Lind & Ponack
Attorneys

2,779,662

PROCESS AND APPARATUS FOR OBTAINING TITANIUM DIOXIDE WITH A HIGH RUTILE CONTENT

Walter Frey, Basel, Switzerland, assignor, by mesne assignments, to Fabriques de Produits Chimiques de Thann et de Mulhouse, Thann (Haut-Rhin), France, a corporation of France Application October 2, 1950, Serial No. 187,924

Claims priority, application Switzerland February 20, 1948

8 Claims. (Cl. 23—202)

The present application is in part a continuation of copending application, Ser. No. 75,886, filed February 11, 1949, for Production of Finely Divided Metal Oxides. The said copending application is concerned with the decomposition of volatile metallic chlorides, inter alia titanium chloride, with oxygen-containing gases for the purpose of obtaining finely-divided metallic oxides, the decomposition being effected at high temperatures and under flame-producing conditions.

The present invention is a further development of the invention of the said copending application, and is more particularly concerned with a modification thereof, useful especially in the manufacture of pigmentary titanium dioxide, whereby the obtained pigment has improved a better controlled physical properties, and whereby it may have a high content of the rutile crystalline form of the pigment.

According to the invention of the said copending application, a mixture (reaction gas) of metallic chloride vapor and oxygen-containing gas, at a temperature of at most 500° C., is allowed to flow into a reaction chamber and is ignited therein to a flame, the heat necessary for the production of the flame being provided by means of an exothermic auxiliary chemical reaction inside the reaction chamber. The burning of combustible gases, such as carbon monoxide or hydrogen, with gases containing oxygen, is preferably used as the auxiliary reaction in the said copending application. To this end, the combustible gas and the gas for its combustion can be introduced into the reaction chamber separately, at least in part, from the oxygen-containing gas, and concentrically around the reaction gas mixture. Thus there is produced around the reaction gas stream a constantly burning auxiliary flame from which the reaction gas mixture is uniformly kindled to a flame.

However, the titanium dioxide obtained by the decomposition of titanium tetrachloride according to the examples of the said copending application is predominantly of the anatase crystal form and contains at best only 5 to 20% by weight of the rutile modification.

The present invention is concerned with an improvement of the basic process and with an apparatus for practicing it, enabling the production of a titanium dioxide pigment which has improved and better controlled properties, and whereby the TiO$_2$ pigment can be produced with a rutile content of at least 40–60% by weight.

The present process is characterized by the fact that a reaction gas mixture of titanium tetrachloride vapor and oxygen-containing gas is allowed to enter a reaction chamber in at least one thin gas layer of at most 1 centimeter thickness and at least 1 millimeter thickness. There it is kindled by means of a flame derived from combustible and oxygen-containing gas and preferably surrounding the reaction gas mixture.

The formation of rutile from titanium tetrachloride and oxygen-containing gas results, as has been established, only at those temperatures which lie far above 1000° C., such as 1200–1400° C. If the reaction gas mixture is kindled to a flame in too thick a layer with the auxiliary flame, then the high temperatures necessary for rutile formation may develop only on the contact surface of the reaction gas stream with the hot flaming gases of the said flame, but the interior of the stream of reaction gas attains temperatures not higher than 800–1000° C., i. e. those for anatase formation but not, however, the necessary high temperature for the formation of rutile.

With the employment of titanium tetrachloride-oxygen gas mixtures in thin layers according to the present invention, on the other hand, the entire mixture or at least the largest part of the same is heated within a short time to the high temperature necessary for the formation of rutile.

The use of a mixture of titanium tetrachloride with oxygen-containing gas is very important for the attainment of the desired effect. The reaction of titanium tetrachloride vapor and oxygen being exothermic, a further amount of heat is developed in the flame, when the decomposition reaction of the titanium tetrachloride starts. If the oxygen for the decomposition is in a uniform mixture with the tetrachloride the decomposition can proceed very rapidly. Therefore the heat is developed in the small space where the decomposition of the whole chloride takes place, thus producing a further increase of temperature. On the other hand, if the oxygen is not in uniform admixture with the tetrachloride, the decomposition can proceed only by diffusion or secondary mingling of the oxygen with the tetrachloride, whereby the heat produced is dissipated throughout a larger space. As the formed solid titanium dioxide dissipates a large amount of heat by radiation, at least part of this heat is lost before the whole amount of titanium tetrachloride is decomposed.

The mixture should preferably contain at least 50% of the oxygen necessary for the decomposition of the titanium tetrachloride but advantageously the mixture contains the stoichiometrically necessary amount of oxygen or even a surplus of 30 to 100%. If the mixture does not contain the requisite amount of oxygen for the decomposition of the TiCl$_4$, the remaining oxygen has to be fed separately, preferably together with the oxygen for the auxiliary combustion reaction.

The mixture may contain, besides titanium tetrachloride and oxygen, also an inert gas such as nitrogen and carbon dioxide. The addition of inert gas affects the particle size of the titanium dioxide produced. An increasing dilution of the mixture with inert gas will decrease the particle size.

In order to get a uniform mixture of titanium tetrachloride vapor and oxygen-containing gas, oxygen or an oxygen-inert gas mixture can be bubbled through liquid titanium tetrachloride contained in a still. In this way, the gases are loaded with titanium tetrachloride vapor to a degree dependent upon the temperature of the still. Titanium tetrachloride furthermore can be vaporized first directly and thereafter be mixed with oxygen-containing gases, preferably in a special mixing vessel. In any case, the mixture of the vapor with the oxygen-containing gas has to be effected before entering the reaction chamber.

However, it is important that, as the reaction mixture is thus being conducted to the reaction chamber, the components thereof be maintained in vaporous condition. Preferably, therefore, according to the invention, the vaporous mixture is further heated to a temperature somewhat in excess of the dew point of the titanium tetrachloride. TiCl$_4$ vapor ordinarily condenses at about 136° C., but this condensation point will vary under the influence of additional gases such as oxygen. Therefore, it is preferred according to the present invention to heat the reaction mixture to a temperature of about 135° C.

or higher in order to prevent the condensation of titanium tetrachloride prior to its introduction into the reaction zone. The presence of any droplets of TiCl₄ in the mixture entering the reaction zone—which droplets, due to the fact that they would be decomposed at a much slower rate than the gaseous or vaporous components of the mixture, would result in the formation of coarse $TiO_2$ particles which are non-pigmentary in character—is thus avoided.

The practical maximum to which the reaction mixture is preheated according to the present invention is about 500° C., whereby premature oxidation of the titanium chloride is avoided. This feature is described and is per se claimed in the aforesaid copending patent application.

The reaction gas mixture can be introduced into the reaction chamber in the form of a thin annular layer of circular or elliptical shape, allowing a flame of combustible gas and oxygen-containing gas to burn around this annular layer of the reaction gas stream for the purpose of igniting this gas. Inside of the annular layer an inert gas may preferably be allowed to flow in, in order to obtain a regular flow; however, a second flame of combustible gas and oxygen-containing gas can be allowed to burn inside the annular layer of the stream of reaction gas. This latter procedure has the advantage that the layer of the reaction gas simultaneously burns to a flame from both sides. The flame burning in the center of the ring can be from burning hydrogen, carbon monoxide, mixtures of the same, hydrocarbon gases, etc. with oxygen-containing gases. The components serving for the combustion reaction can be introduced separately inside the layer of the reaction gas or they can be, if the entrance velocities and the mixing ratios are so chosen that back-firing is avoided, also introduced in pre-mixed condition. Since this central flame will be completely surrounded by the relatively cold reaction gas stream, the danger exists that once the flame is extinguished for any reason, and there being no hot kindling surface present, the flame will not kindle itself anew. The conditions are therefore preferably adjusted according to the invention so that a continuous or permanent burning of the flame will be provided. This can be realized by using gases for the production of the kindling flame inside the reaction stream which gases ignite themselves on coming together, for example, gases preheated to a kindling temperature. Use may also be made of small amounts of a gaseous ignition catalyst, as for example carbon disulfide vapor, which reduces the ignition temperature of the auxiliary flame several hundred degrees centigrade.

The reaction gas mixture can also be introduced in the form of several circular or elliptically-shaped annular layers lying within one another, the several annular layers being separated from each other by a ring-shaped flame of combustible gases and oxygen-containing gases, and the outermost layer of the reaction gas being likewise enclosed by a flame. The gases for the combustion reaction can, in this connection, be supplied either in separate form or already mixed. The same precautions should preferably be taken for the annular flame between the layers of the reaction gases as have already been described in connection with the central flame.

The reaction gas mixture, however, may also be supplied to the reaction chamber in the form of a long narrow layer which likewise is kindled by a long narrow flame of combustible gases and oxygen-containing gases.

Finally, the reaction gas can be supplied in the form of a plurality of relatively small streams which may be circular or annular in cross section. In the former case, the diameter of the circular stream should not exceed 1 centimeter, and this is true also of the thickness of the annular streams. The thus-subdivided individual small streams of reaction gas may each be surrounded by a flame of burning combustible gas and oxygen-containing gas or only the totality—i. e. the assembly—of these individual small streams may be so surrounded.

It may be advantageous to impart a spiral movement to the streams of gas being fed to the reaction chamber, and this may be accomplished in any suitable way as by means of conducting baffles or the like arranged within the respective feed conduits.

The apparatus for carrying out the process of the invention is, briefly stated, characterized by the fact that at least one exit opening is provided for the reaction gas mixture and that this opening has a cross section of such dimensions that the reaction gas stream has at most a thickness of 1 centimeter. Advantageously the exit opening of the reaction gas mixture is surrounded by at least one gas exit opening for the gases of the combustion reaction. The exit opening for the reaction gas mixture can be of an annular cross section with an annulus thickness of at most 1 centimeter. It may, however, also assume the form of a flat slot of at most 1 centimeter slot breadth. The exit of the reaction gas can also take place through a plurality of exit openings, of which the largest cross sectional dimension of each individual exit opening amounts to at most 1 centimeter.

On the accompanying sheets of drawings, there are shown by way of illustration several presently preferred embodiments of apparatus for carrying out the present invention. On the said sheets:

Fig. 1 is a diagrammatic showing, in vertical longitudinal section through a reaction chamber suitable for carrying out the present invention;

Fig. 2 is a cross sectional view along line a—a of Fig. 1;

Fig. 3 is a cross sectional view along line a—a of Fig. 1, but showing a modified form of gas feeding device;

Fig. 4 is a cross sectional view along line a—a of Fig. 1, but showing another embodiment of gas feeding device;

Fig. 5 is a cross sectional view along line a—a of Fig. 1, but showing still another modified form of gas feeding device; and Fig. 6 is a cross sectional view along line a—a of Fig. 1, but showing still another embodiment of gas feeding device.

It will be understood that the present invention is more particularly concerned with the construction of gas feeding device and that a wide variety of reaction chambers proper, fitted with such a device, may be employed.

As shown in Fig. 1, a convenient apparatus for carrying out the invention may consist in general of a reaction chamber (a) formed by heat-insulated walls, which may be heated externally, and a reactant gas supply device (b) comprising one or more sets of concentric feed tubes or conduits, as hereinafter described in greater detail. The apparatus may also conveniently comprise a funnel (e) serving to carry away the precipitated titanium dioxide, and an exhaust opening (f) for drawing off the produced crude gases which, in view of their content of titanium dioxide, may advantageously be delivered to a dust-extracting plant.

In the construction according to Fig. 2, the gas supply device (b) consists of four concentric tubes. An inert gas, for example nitrogen, is fed through the innermost tube 1. The distance between tube 1 and tube 2 is at least 1 millimeter and at most 1 centimeter, and the reaction gas mixture consisting of titanium tetrachloride vapor and oxygen-containing gas is fed in through the annular space defined between the said two tubes. The passageway defined between tubes 2 and 3 is used for the supply of one component (for instance, carbon monoxide) for the combustion reaction, while the passageway defined between tubes 3 and 4 serves for the passage of the other combustion component (for instance, oxygen or oxygen-containing gas such as air).

Suitable and conventional means (not shown) may be used for causing a flow of the various gases—in this and in the other embodiments of the invention—and, if desired, for preheating the same or selected ones thereof.

In the construction according to Fig. 3, the gas supply device (b) consists of five tubes, preferably concentrically arranged within one another, as shown. The space, not more than 1 centimeter in thickness, between conduits 6 and 7 is utilized for the passage of the reaction gas mixture. The annular passage on each side of the passage for the reaction gas mixture, is utilized for one component (for instance carbon monoxide) for the combustion reaction, while the innermost and outermost passages are used for the other component (for instance oxygen) for the combustion reaction. In this way the components for the combustion reaction effectively surround the effluent stream of reaction gas mixture flowing into the reaction chamber. The stream of gas passing through the conduit 5 is, of course, circular in section while the remaining streams of gas—namely, those between conduits 5 and 6, between conduits 7 and 8, and between conduits 8 and 9—are annular in cross-sectional configuration.

In the construction according to Fig. 4, the gas supply device (b)—which in the precedingly described and specifically described embodiments is circular in cross-section—has an elongated cross-section, as shown more particularly in Fig. 4 of the drawings. In this embodiment, the device (b) is made up of three flattened tubes, arranged preferably concentrically within each other as shown, defining passages 10, 11 and 12 therebetween. The central passageway or slit 10 which maximally is of 1 centimeter in breadth, serves for the passage of reaction gas mixture, while one or the other of the components for the combustion reaction passes through each of conduits 11 and 12, respectively.

The construction of device (b) according to Fig. 5 comprises a solid central core member provided with a circularly arranged series of bores 19 extending therethrough, each bore 19 having a maximum diameter of 1 centimeter. These bores serve for the passage of reaction gas mixture. Concentrically disposed around the said central core are successive tubes 20 and 21, defining a pair of concentric annular passageways about the core. The outermost one of these passageways may be used for feeding one of the components for the auxiliary chemical reaction and the other passageway for the other component. In this way, the totality of streams of reaction gas coming into the reaction chamber through bores 19 is surrounded by a combustion reaction mixture, and when the latter is ignited, by a flaming zone of decomposition.

In the embodiment of device (b), as shown in Fig. 6 of the drawing, it takes the form of a solid cylindrical structure provided with a series of circularly arranged bores 24. Each bore 24 has positioned therein a pair of spaced concentric tubes 23 and 22. The inner diameter of the latter is at most 1 centimeter. The reaction gas mixture flows through the several tubes 22. The two annular passageways defined about each central conduit 22 serve, respectively, for the passage of the several components for the reaction gas mixture.

Carrying out the process is not limited, however, to the apparatus here illustrated. Other arrangements are possible, provided that the greatest breadth of the exit openings for the reaction gas mixture does not exceed a maximal breadth of 1 centimeter, and provided those of the exit for the gases of the ignition reaction surround them.

The following examples further illustrate the invention, without however, being limitative thereof. Percentages are by volume.

*Example 1*

An ignition apparatus according to Fig. 2 is used in which the inner and outer diameter of the four concentric tubes have the following size: tube 1: 20 to 22 millimeters, tube 2: 26 to 29 millimeters, tube 3: 33 to 36 millimeters, tube 4: 39 to 42 millimeters. To the reaction chamber, the temperature of which is held at about 1200° C., the following gases are conducted through the feed device (b): through tube 1 with an exit velocity of 50 centimeters per second—well dried nitrogen; through the annular space between tubes 1 and 2 with an exit velocity of 500 centimeters per second—a mixture of 26% $TiCl_4$ vapor, 37% $O_2$ and 37% $N_2$, the mixture being at a temperature of about 150° C.; through the annular space between tubes 2 and 3, pure carbon monoxide gas with an exit velocity of 150 centimeters per second; and through the annular space between tubes 3 and 4 pure oxygen with an exit velocity of 85 centimeters per second.

The carbon monoxide and oxygen are preferably supplied at normal or slightly elevated temperature (e. g. 100 to 200° C.) and are preferably ignited, with the aid of convential mechanical ignition means if necessary, before starting the introduction of the reaction mixture ($TiCl_4/O_2/N_2$), with production of a flame a short distance in front of the outlet for the reaction mixture. Thereupon the reaction mixture is also introduced into the reaction chamber, the feed of CO and $O_2$ being maintained so that the CO flame surrounds the inflowing gas stream of reaction mixture. The reaction gas mixture is ignited at a distance of about 3 to 5 millimeters from the exit opening by this constantly burning flame of CO and $O_2$. A $TiO_2$ pigment of about 0.5 micron particle size with a rutile content of around 40%, a color value of 105 and a tinting strength of 1350 is obtained.

*Example 2*

An ignition apparatus according to Fig. 3 is used having five concentric tubes of the following sizes: tube 1: 20 to 22 millimeters; tube 2: 26 to 29 millimeters; tube 3: 39 to 42 millimeters; tube 4: 52 to 55 millimeters; and tube 5: 60 to 64 millimeters. To a reaction chamber held at 1200° C., the following is fed: in the innermost tube: 18 liters per minute of $H_2$ at 400° C., which contains 1% of $CS_2$ vapor; in the annular space between the first and second tubes: 9 liters per minute of $O_2$ at 400° C.; in the annular space between the second and third tubes at a temperature of 200° C., a mixture of 40 liters per minute of $TiCl_4$ vapor, 60 liters per minute of $O_2$ and 60 liters per minute of $N_2$; in the annular space between the third and fourth tubes, 40 liters per minute of CO gas; and in the outermost annular space; 20 liters per minute of oxygen. The flame-supporting auxiliary chemical reaction—burning of the combustible gases—takes place as in Example 1. A $TiO_2$ of about 0.5 micron particle size is obtained with 60% content of rutile, a color value of 103 and a tinting strength of 1450.

*Example 3*

Use is made of an ignition apparatus including a supply device (b) according to Fig. 4 and comprising three flattened tubes defining three conduits 10, 11 and 12. The outermost tube has a cross-section interior dimension of 17 millimeters in breadth and 54 millimeters in length. The intermediate tube, the wall thickness of which is 1 millimeter, has a cross-sectional interior dimension of 10 millimeters in breadth and 47 millimeters in length. The central or innermost tube, which is also of 1 millimeter in wall thickness, has a cross-sectional interior dimension of 3 millimeters in breadth and 40 millimeters in length.

Through the thus-constituted supply device (b), leading to a reaction chamber (a) at a temperature of 1200° C., there is fed through the central conduit 10 a mixture of 1 volume of titanium tetrachloride vapor, 0.75 volume of oxygen and 0.25 volume of carbon dioxide at a temperature of 150° C. and at an exit velocity of 500 centimeters per second; through the intermediate conduit 11 a mixture of 1 volume of CO and 0.2 volume of methane at a velocity of 250 centimeters per second; and through the outermost conduit 12 oxygen at a velocity of 200 centimeters per second. The combustibles are ignited as in Example 1. A TiO₂ pigment with a rutile content of 50%, a color value of 107 and a tinting strength of 1400 is obtained.

*Example 4*

Use is made of an ignition apparatus including a supply device according to Fig. 5, the diameter of each of the twelve circularly arranged bores 19 being 3 millimeters, whereas the diameter of the solid core member is 30 millimeters. The tube 20 has an internal diameter of 38 millimeters and a wall thickness of 1 millimeter, whereas the outermost tube 21 has a diameter of 48 millimeters.

The said apparatus is mounted, as in Fig. 1, on the top of a reaction chamber (*a*) maintained at a temperature of 1300° C. A mixture of 1 volume of TiCl₄, 1 volume of O₂ and 1 volume of N₂ is fed at a temperature of 120° C. through the bores 19 at a velocity of 1000 centimeters per second, a mixture of 1 volume of CO, 2 volumes of N₂ and 0.1 volume of C₆H₆ through the annular passageway between the solid core member and the tube 20 at a velocity of 200 centimeters per second, and a mixture of oxygen and nitrogen (2:1 by volume) through the annular passageway between the tubes 20 and 21 at a velocity of 150 centimeters per second. The combustibles are ignited as in Example 1. A TiO₂ pigment with a rutile content of 45% and a tinting strength of 1380 is obtained.

*Example 5*

An ignition apparatus including a supply device according to Fig. 6 with six bores 24, each 18 millimeters in diameter, is used in combination with a reaction chamber (*a*). Inside each of the bores 24, a pair of concentric tubes 23 and 22 with 15 and 10 millimeters outside diameter, respectively, and a wall thickness of 1 millimeter is positioned. Through the tubes 22, there is introduced a mixture of 1 volume of TiCl₄, 2 volumes of O₂ and 1 volume of N₂ at a velocity of 200 centimeters per second and a temperature of 125° C., through tubes 23 there is introduced pure oxygen at a velocity of 100 centimeters per second and through the spaces between bores 24 and tubes 23 there is introduced pure CO at 130 centimeters per second exit velocity. The combustibles are ignited as in Example 1. A TiO₂ pigment with a rutile content of 40% and a tinting strength of 1300 is obtained.

The tinting strength evaluations hereinbefore set forth are based upon an arbitrary scale in which present commercial titanium dioxide of anatase crystal structure has a value of about 1250 and commercial rutile titanium dioxide has a value of about 1500. The method of making these evaluations is described in "Physical and Chemical Examination of Paints, Varnishes, Lacquers, and Colors," by H. A. Gardner and G. G. Sward, 10th edition, pages 44 and 45, as the "National Lead Company Method."

Having thus disclosed the invention, what is claimed is:

1. A process for producing titanium dioxide, which comprises continuously flowing into a reaction chamber an annular stream of a gaseous mixture containing vaporized anhydrous titanium tetrachloride and at least enough oxygen to support complete decomposition and combustion of the titanium tetrachloride, in the form of a thin gaseous layer having a thickness of at most 1 cm. and at least 1 mm., and igniting the gases in said layer and maintaining a flame thereof in said chamber by contacting said layer near the point of its entrance into said chamber with auxiliary flames sustained by separate inflows of a combustible gas and an oxygen containing gas inside and outside said annular layer, thereby intensively decomposing and oxidizing the titanium tetrachloride to form finely divided titanium dioxide.

2. A process for producing titanium dioxide, which comprises continuously flowing in a reaction chamber a gaseous mixture containing vaporized anhydrous titanium tetrachloride and at least enough oxygen to support complete decomposition and combustion of the titanium tetrachloride, in the form of a thin annular gaseous layer having a thickness of at most 1 cm. and at least 1 mm., and igniting the gases in said layer and maintaining a flame thereof in said chamber by contacting said layer continuously with auxiliary flames respectively sustained inside and around said annular gaseous layer by burning carbon monoxide with oxygen introduced in respective streams separate from said layer, thereby intensively decomposing and oxidizing the titanium tetrachloride to form finely divided titanium dioxide.

3. A process for producing titanium dioxide with a high rutile content which comprises continuously forming in a reaction zone two streaming annular flames of combustible gas lying one within another and supplying concurrently between and burning in contact with said flames a separate annular gaseous stream containing anhydrous titanium tetrachloride in admixture with at least enough oxygen to oxidize the same completely, in the form of a thin gaseous layer having a thickness of at most 1 cm. and at least 1 mm., thereby intensively decomposing and oxidizing the titanium tetrachloride into finely divided titanium dioxide.

4. A process for producing titanium dioxide, which comprises continuously maintaining a flame of a preformed combustible mixture of vaporized anhydrous titanium tetrachloride and oxygen containing gas from a thin annular gaseous stream thereof having a thickness of at most 1 cm. and at least 1 mm. by contacting said layer with an enveloping hotter flame sustained by separate inflows of a combustible gas and an oxygen containing gas surrounding said stream, thereby intensively decomposing and oxidizing the titanium tetrachloride to form finely divided titanium dioxide.

5. A process for producing titanium dioxide, which comprises continuously forming and maintaining a flame of a homogeneous combustible mixture of anhydrous titanium tetrachloride and oxygen-containing gas from a thin annular streaming layer thereof having a thickness of at most 1 cm. and at least 1 mm. by continuously contacting said layer with an enveloping auxiliary flame sustained by a combustible gas inflow surrounding said layer and having a substantially higher flame temperature than said mixture, thereby intensively decomposing and oxidizing the titanium tetrachloride to form finely divided titanium dioxide.

6. A process for producing titanium dioxide, which comprises continuously flowing into a reaction zone a preformed homogeneous gaseous mixture containing titanium tetrachloride and oxygen to support combustion of the titanium tetrachloride vapor, in the form of a thin annular layer having a thickness of at most 1 cm. and at least 1 mm. surrounding a separately inflowing stream of an inert gas, and igniting the gases in said annular layer and maintaining a flame thereof in said zone by contacting said layer continuously with an enveloping auxiliary flame sustained by separate inflows of a combustible gas and an oxygen-containing gas surrounding said layer, thereby intensively decomposing and oxidizing the titanium tetrachloride to form finely divided titanium dioxide.

7. A process for producing titanium dioxide, which comprises continuously forming in a reaction zone a series of streaming annular flames of combustible gas lying one within another and supplying concurrently thereinto and burning in contact with said flames a series of separate annular gaseous streams having a thickness of at most 1 cm. and at least 1 mm. of a pre-formed homogeneous mixture containing vaporized anhydrous titanium tetrachloride and oxygen to support combustion of the titanium tetrachloride vapor, said streams being supplied one within another and each between two of said annular flames, thereby intensively decomposing and oxidizing the titanium tetrachloride to form finely divided titanium dioxide.

8. A process for producing titanium dioxide, which comprises continuously flowing into a reaction zone a pre-formed, homogeneous combustible mixture containing titanium tetrachloride and oxygen-containing gas in the form of a thin annular layer having a thickness of at most 1 cm. and at least 1 mm., said pre-formed mixture being at a temperature between the dew point of titanium tetrachloride and 500° C., and igniting the gases in said annular layer and maintaining a flame thereof by contacting said layer continuously with auxiliary flames sustained by separate inflows of a combustible gas and an oxygen-containing gas inside and outside said annular layer, thereby decomposing and oxidizing the titanium tetrachloride to form finely divided titanium dioxide.

References Cited in the file of this patent

UNITED STATES PATENTS

| | | |
|---|---|---|
| 834,257 | Brunler | Oct. 30, 1906 |
| 1,484,107 | Zander | Feb. 19, 1924 |
| 1,510,039 | Canfield | Sept. 30, 1924 |
| 1,515,172 | Ronstrom | Nov. 11, 1924 |
| 1,850,286 | Mittasch | Mar. 22, 1932 |
| 1,931,380 | Haber et al. | Oct. 17, 1933 |
| 1,931,381 | Haber et al. | Oct. 17, 1933 |
| 1,995,934 | Mangold | Mar. 26, 1935 |
| 2,072,375 | McCallum | Mar. 2, 1937 |
| 2,089,937 | Bender | Aug. 17, 1937 |
| 2,155,119 | Ebner | Apr. 18, 1939 |
| 2,167,183 | Naab et al. | July 25, 1939 |
| 2,240,343 | Muskat | Apr. 29, 1941 |
| 2,366,669 | Maude | Jan. 2, 1945 |
| 2,408,282 | Wolf | Sept. 24, 1946 |